United States Patent [19]

Hicks

[11] Patent Number: 4,829,673

[45] Date of Patent: May 16, 1989

[54] PRECISION SELF-ACTUATED WOODWORKING TOOL

[76] Inventor: Carroll E. Hicks, Box 555, Calico Rock, Ark. 72519

[21] Appl. No.: 215,800

[22] Filed: Jul. 6, 1988

[51] Int. Cl.[4] .......................... B23D 3/00; B26B 5/00

[52] U.S. Cl. .......................... 30/167; 30/168; 30/277

[58] Field of Search .......................... 30/168, 167, 167.1, 30/167.2, 277, DIG. 5; 173/90, 91, 119; 227/147

[56] References Cited

U.S. PATENT DOCUMENTS 1,174,785 3/1916 Watts .......................... 30/277
1,435,866 11/1922 McGahey .
2,485,877 10/1949 Hamilton et al. .......................... 30/277

FOREIGN PATENT DOCUMENTS 148546 7/1985 European Pat. Off. .......................... 30/168

*Primary Examiner*—Douglas D. Watts

*Attorney, Agent, or Firm*—Kalish & Gilster

[57] ABSTRACT

A self-actuated woodworking tool [T] for one-handed reciprocating operation has a chambered haft [1] and a tool shank [4] carried captively axially within the haft in slidable, reciprocal relationship. A shank portion [5] extending forwardly from the haft has a cutting edge [6]. A haft ferrule [11] precisely orients the shank and so also the cutting edge angularly with respect to the haft. The haft cross-section permits the user to know by tactile feedback the angular orientation of the haft and thus also the cutting edge. A guide [10] carried by the shank within the chamber cooperates with the ferrule and provides low-friction sliding interengagement between the tool shank and walls of the chamber without radial displacement from the axis. The chamber [3] provides an internal contact surface [16] for hammer-like blows thereon against a shank butt [17] for driving the cutting edge against the workpiece. A kick-back spring [19] assists in reciprocation of the haft, which brings about self-actuated blade-cutting action on the workpiece.

13 Claims, 1 Drawing Sheet

PRECISION SELF-ACTUATED WOODWORKING TOOL

BACKGROUND AND SUMMARY OF THE INVENTION

The invention relates in general to a wood-working tool, in particular, to a self-actuated high precision chisel.

Self-actuated tools of this type typically consist of a reciprocating shaft and a weighted handle which may incorporate a spring. Such tools typically are impartial as to the rotational orientation of the cutting edge in relation to the handle and therefore provide no means of controlling such orientation as in U.S. Pat. No. 1,435,866 issued to McGahey. Still other such tools imprecisely impart a fixed orientation as between handle and working surface by means of a pin and slot configuration as taught by Hamilton, Jr. U.S. Pat. No. 2,485,877. This method of controlling orientation is imprecise due to the loose fit and limited contact between pin and slot. This means is also cumbersome in that there is relative movement outside the guide sleeve resulting in potential for pinch, and is inexact in that the orientation greatly depends on the visual placement by the user of the orientation of the cutting edge.

Therefore, it is an object of the present invention to impart exact orientation of the cutting edge by means of a configured haft which has a precisely fitted relationship to a reciprocal tool shank, and wherein the shank carries precision guide means for low-friction axially precise sliding inter-relationship with the walls of chamber within the haft to prevent angular misalignment.

It is also an object of this invention to provide such a tool which may be used both as a self-actuated woodworking tool and a conventional chisel as it might be struck on the cutting edge-remote end with a mallet to impart force to the cutting edge.

A still further object of the invention is to provide such a tool having a precision crafted chambered haft configured such that the orientation of the cutting edge is accurately perceived by the user merely by tactile sensation communicated via the haft/tool shank relationship.

Another object of the invention is the provision of such a tool which includes a kick-back spring for assisting in the self-actuated mode of usage.

Further objects of the invention will be apparent from a continued reading below.

DESCRIPTION OF THE PREFERRED EMBODIMENT

Figure 1:
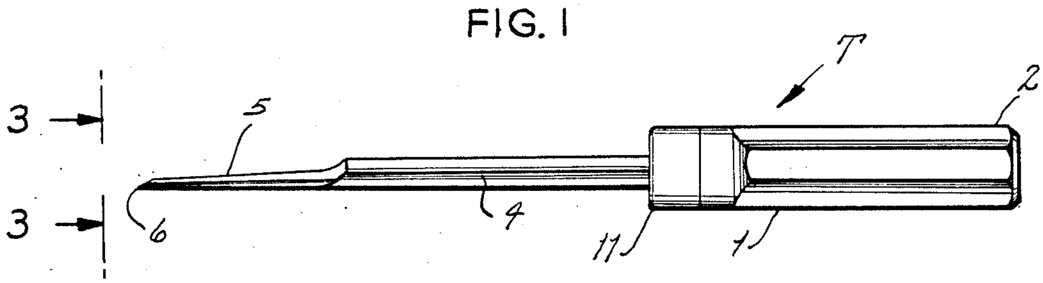
FIG. 1 is a side elevation view of the tool embodying the present invention with the working end of the tool shank in a flat position.
Figure 2:
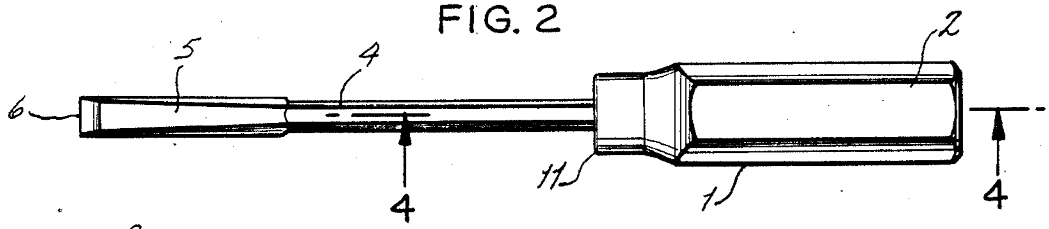
FIG. 2 is a side elevation view of the tool in FIG. 1 rotated 90° to show geometric features of the invention not discernible in FIG. 1.

Referring to the drawings, there is a woodworking tool indicated generally at T including a haft 1 providing an exterior grip portion 2 and interior chamber 3.

Extending from within the chamber 3 is a tool shank 4, hexagonal in cross-section, having a working tip 5 with a rectilinear, sharpened cutting edge 6 at the haft-remote end. Captive in haft 1 is an inner portion 8 of the shank, carrying a slidable guide means 10, simply called herein a guide, which provides for guided reciprocal, though laterally and radially restricted, low-friction movement of tool shank longitudinally within chamber.

At the cutting edge-proximate end of haft 1 is an interiorally hexagonal ferrule 11, snugly circumscribing tool shank 4 and strictly precluding relative rotational movement thereof.

Ferrule 11 and tool shank 4 are appropriately constructed of dimensionally stable and wear resistant materials, such as hardened tool steel, and stainless steel alloys, to preserve the orientational integrity of the haft/tool shank relationship. Ferrule 11 also longitudinally confines slidable guide means 10 by contact with one of a pair of stop-washers 12, 12′, as held in place by shank upsets 13, 13′, or appropriately maintaining guide means 10 fixed longitudinally on tool shank 4 and so maintaining tool shank 4 within haft chamber 3.

Ferrule 11 carries internal threads 22 which are threaded upon threads 23 integral with haft 1 for haft-/ferrule interconnection while permitting inspection access if desired.

Guide means 10 is most preferably a precisely machined cylindrical collar of dimensionally-stable, low-friction synthetic material, such as chlorinated tetrafloroethylene such as sold under the trade designation "TEFLON", having an outside dimension fitted closely within the corresponding inside diameter of the cylindrical recess or chamber 3 so as to glide along the walls thereof with almost imperceptible friction while positively preventing radial displacement or misalignment, and so cooperating with ferrule 11 to cause the shank to be held in precise axial relationship for reciprocating movement of the shank with relative movement of guide 10 from one end of the chamber to the other.

At the cutting edge-remote end of chamber 3 is a planar interior contact surface 16 which extends perpendicular to the longitudinal axis of the tool. When longitudinally forwardly impelled against shank butt 17 by user actuation of the haft, surface 16 imparts working force axially along tool shank 4 to force cutting edge 6 into a workpiece.

Figure 7:
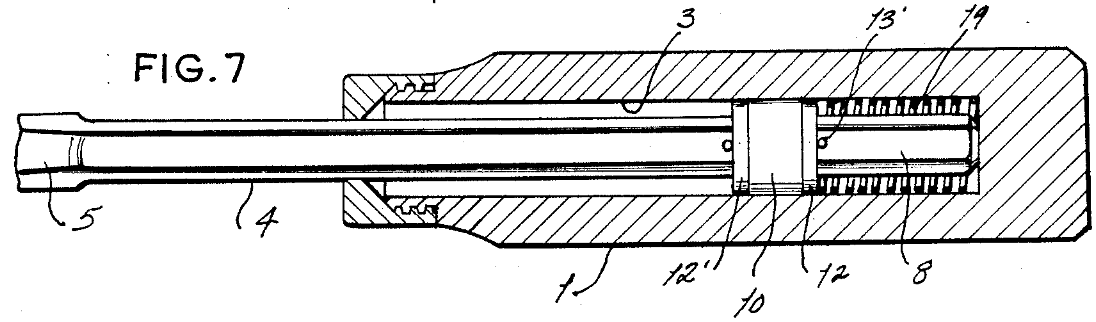
FIG. 7 is a longitudinal cross-section showing the tool in its fully retracted position.

In use of the new tool, haft 1 is reciprocated by the user to repeatedly drive surface 16 into contact with the shank butt. Such longitudinal motion can be brought about easily by virtue of the low friction relationship of guide 10 within the haft chamber but preferably there is employed a kick-back spring 19, of coiled compression type, within chamber 3. It is most preferrably of limited length such as normally to be confined within a predetermined longitudinal dimension P from interior contact surface 16 aft of the slidable guide 10, which accordingly will come into contact with the inner end of the spring as the haft is forced forwardly by use toward completion of the stroke. Such action compresses the spring, as shown in FIG. 7, for causing the spring to bear at one end against surface 16 and at the other, inner end against guide 10. This stores part of the energy of the forward haft stroke which, upon rearward haft movement aids in returning the haft to the rearmost position (i.e., with shank 4 in its most forward position within chamber 3) and so facilitating use. Kick-back spring 19 thereby provides means for returning tool shank 4 to its posture relative to interior contact surface 16 within chamber 3 which suitably facilitates a successive woodworking reciprocation.

To provide for most effective self-actuated operation, haft 1 is most preferably of relatively massive character, being formed for example of stainless steel with comparatively thick walls and a deep butt portion 21, in relation to other dimensions. Other steels and metal alloys may also be employed.

Figure 3:
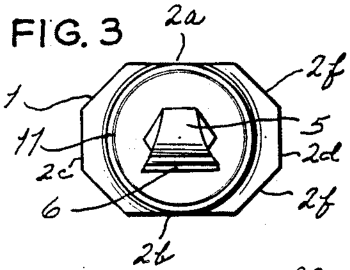
FIG. 3 is a view from the haft-remote end of the tool.
Figure 5:
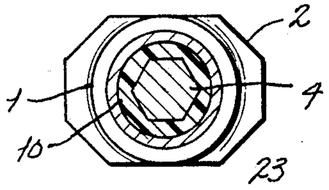
FIG. 5 is a lateral cross section as taken generally along line 5—5 of FIG. 4.
Figure 6:
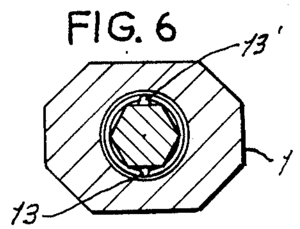
FIG. 6 is a lateral cross section as taken generally along line 6—6 of FIG. 4.
Figure 4:
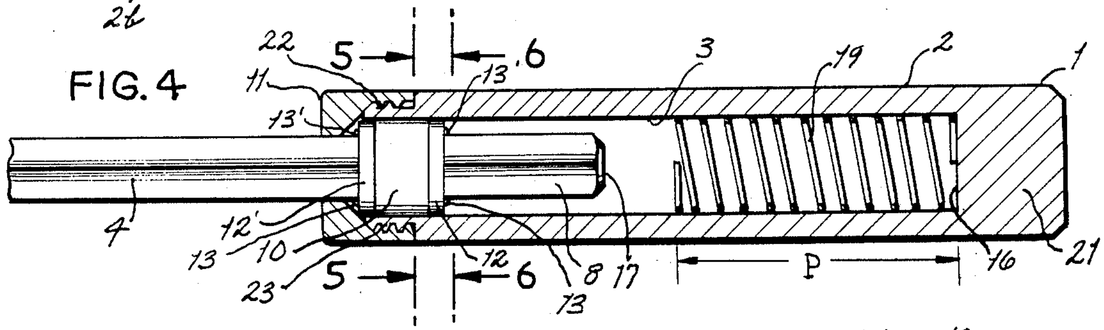
FIG. 4 is a longitudinal cross-section showing the features of the chambered haft when the tool is in its fully extended position.

Haft 1 is dimensionally configured such that the exact rotational orientation of cutting edge 6 is communicated to the craftsman by way of tactile transmission through the haft. In addition, the dimensions and weight distribution of the haft, as hereinabove described and as apparent from the drawings, are such that the stability and equilibrium of the tool assists in the "feel" communicated to the user. It will be seen in FIGS. 3, 5 and 6 that the cross-section of handle portion 2 is noncircular and provides an unusually broad aspect, including planar, parallel top and bottom horizontal surfaces **2*a*, 2*b* and planar, parallel side wall vertical surfaces 2*c*, 2*d* of lesser dimension in plan to provide an width/height aspect ratio of about 1.3:1. As conventionally grasped, the upper surface 2*a* may bear against the user's palm while the fingers curl around to grasp the lower surface 2*b* and so the user obtains intrinsically an immediate tactile feedback or "feel" of the cutting surface orientation without needing to look at the actual orientation of the tool. Moreover, chamfers 2*f*, each of 45° orientation relative to the other four handle surfaces, are formed or machined at the four "corners" of the handle, as so viewed in these drawing figures. Surfaces 2*f*** facilitate grasping but additionally impart an octagonal exterior surface configuration to the haft to permit the tool to be stable on any of the eight surfaces, if set aside on any flat supporting surface, as might be required during execution of a particular woodworking operation. The craftsman may thus be provided with assurance that the orientation of the tool will remain precisely as it was when so set aside, permitting the tool to be accurately and immediately put back into use without requiring its reorientation.

Figure 8:
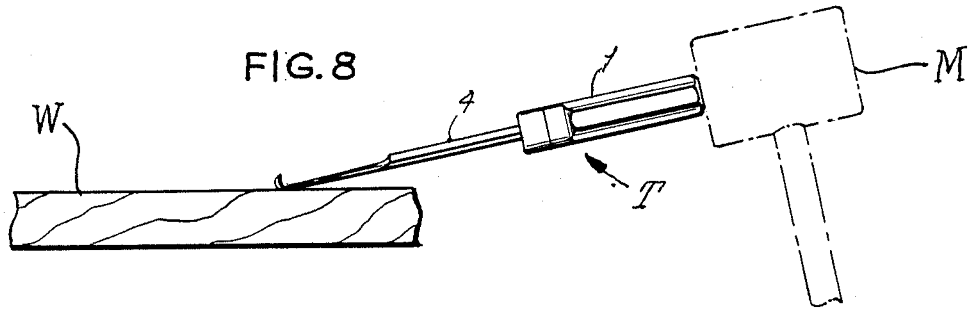
FIG. 8 is a side view generally as in FIG. 1 of the tool as it might be used either as self-actuated or with percussive force being imparted by a mallet.

Usage is demonstrated in FIG. 8, wherein the new self-actuated woodworking tool provides high precision repetitive blade-cutting action on a workpiece W of wood or the like by one-handed reciprocating operation by the user. Normally, haft operation is carried out by reciprocating action by the user to bring about the self-actuated cutting action according to the mode of operation previously noted. However, the design permits alternatively the striking of the haft butt portion 21 with a mallet M, if desired.

In view of the foregoing, it is seen that the several objects of the invention, as well as other advantages, are obtained by the best mode of the tool just described.

However, as various additions and variations of the tool may be brought about, it is intended that the foregoing description be considered as illustrative rather than limiting.

What is claimed is:

1. A self-actuated woodworking tool for high precision repetitive blade-cutting action on a workpiece by one-handed reciprocating operation by the user, comprising a chambered haft, a tool shank carried axially within the haft, and captive therein in slidable, reciprocal relationship, the haft having a chamber for receiving the tool shank with the cutting edge-remote end of the tool shank at all times within the chamber, a portion of the tool shank extending from the chamber only from a forward end of the haft, the tool shank having at its outer, haft-remote end a cutting edge for providing said cutting action, the haft carrying means for precisely orienting and maintaining the tool shank in angular relationship with respect to the haft whereby angular orientation of the haft provides corresponding angular orientation of the tool shank and thus also the cutting edge, the haft having a length for being gripped by at least one hand of the user and configured to permit the user to orient the tool by angular rotation of the haft for causing corresponding angular rotation of the cutting edge, the haft being shaped for permitting the user to know by tactile feedback the angular orientation of the haft and thus also the cutting edge, the chamber being closed at one end remote from the cutting edge for providing an internal contact surface for impinging against a butt end of the tool shank to provide hammer-like blows thereon for propelling the tool shank forward whereby to drive the cutting edge against the workpiece, and precision guide means within the said recess for providing low-friction axially precise sliding interengagement between the tool shank and walls of the chamber whereby the tool shank may move along the longitudinal axis of the chamber without substantial frictional resistance therebetween such as would interfere with the positioning of the cutting edge during reciprocation of the haft and substantially without radial displacement from the axis, the tool shank being held slidably captive within the chamber, whereby such reciprocation causes self-actuated blade-cutting action on the workpiece by the cutting edge.

2. The self-actuated woodworking tool of claim 1, further comprising kick-back means interengaging the haft and the tool shank within the chamber for assisting in causing the tool shank to extend outwardly from the haft while permitting the user to apply reciprocating blows to the tool shank by corresponding reciprocating action of the haft toward and away from the work piece.

3. The self-actuated woodworking tool of claim 2 wherein the kick-back means comprises a spring.

4. The self-actuated woodworking tool of claim 3 wherein the spring comprises a coiled compression spring having one end adapted for bearing against the guide means and another end adapted for bearing against the closed end of the chamber.

5. The self-actuated woodworking tool of claim 4 wherein the spring is of a length such that during one mode of operation of the tool the spring is not in contact with both the guide means and the closed end of the chamber.

6. The self-actuated woodworking tool of claim 1, the haft being shaped in preselected, non-circular cross-section such that the rotational orientation of the tool and thereby of the cutting edge is transmitted to the user by tactile communication.

7. The self-actuated woodworking tool of claim 6, the haft being of polygonal exterior cross-section.

8. The self-actuated woodworking tool of claim 7, the exterior cross-section being octagonal with an opposed pair of the cross-sectional dimensions substantially larger than the other dimensions.

9. The self-actuated woodworking tool of claim 1 wherein the tool shank orienting means is a ferrule removably attached to the haft.

10. The self-actuated woodworking tool of claim 9 having chamber opening of interior dimensions which closely conform to the exterior dimensions of the tool shank, thereby preventing relative rotation of the shank and haft.

11. The self-actuated woodworking tool of claim 10 wherein the ferrule is threadably attached to the haft and the tool shank exterior and ferrule interior are correspondingly hexagonal in cross-section.

12. The self-actuated woodworking tool of claim 1, the precision guide means being a sleeve of low-friction material affixed to the tool shank.

13. The self-actuated woodworking tool of claim 12, wherein the sleeve is constructed of "TEFLON" material, and further comprising means on opposite ends of the sleeve affixing the sleeve to the tool shank.

* * * * *